United States Patent
Durig et al.

(10) Patent No.: US 7,603,119 B1
(45) Date of Patent: Oct. 13, 2009

(54) AUTOMATIC OVER-THE-AIR UPDATING OF A PREFERRED ROAMING LIST (PRL) IN A MULTI-MODE DEVICE, BASED ON AN ACCOUNT ASSOCIATION BETWEEN THE DEVICE AND A WIRELESS LOCAL AREA NETWORK (WLAN) ACCESS POINT

(75) Inventors: Dan Durig, Olathe, KS (US); Robert C. Lamb, Blue Springs, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 405 days.

(21) Appl. No.: 11/366,795

(22) Filed: Mar. 2, 2006

Related U.S. Application Data

(60) Provisional application No. 60/662,335, filed on Mar. 16, 2005.

(51) Int. Cl.
*H04W 4/00* (2009.01)
*H04M 3/00* (2006.01)
(52) U.S. Cl. ............. 455/432.3; 455/432.1; 455/435.2; 455/419
(58) Field of Classification Search ............. 455/432.1, 455/432.3, 435.1, 435.2, 436, 439, 419
See application file for complete search history.

(56) References Cited

U.S. PATENT DOCUMENTS 6,622,017 B1    9/2003  Hoffman
7,283,507 B2 *  10/2007 Buckley et al. ............. 370/338
7,349,695 B2 *  3/2008  Oommen et al. ......... 455/432.1
2005/0261970 A1  11/2005 Vucina et al.
2006/0209773 A1 *  9/2006 Hundal et al. ............... 370/338

OTHER PUBLICATIONS

Non-Final Office Action from U.S. Appl. No. 11/366,781, mailed Jun. 12, 2008.
Non-Final Office Action from U.S. Appl. No. 11/366,781, mailed Dec. 16, 2008.
Unpublished U.S. Appl. No. 11/366,781, entitled "User-Initiated Over-the-Air Update of a Preferred Roaming List (PRL) in a Multi-Mode Device," filed Mar. 2, 2006 in the name of Dan Durig.
Unpublished U.S. Appl. No. 11/366,130, entitled "Temporarily Overriding a Preferred Roaming List (PRL) in a Multi-Mode Device, in Favor of a Wireless Local Area Network (WLAN) Access Point," filed Mar. 2, 2006 in the name of Dan Durig.

* cited by examiner

*Primary Examiner*—George Eng
*Assistant Examiner*—Un C Cho

(57) ABSTRACT

Methods and systems are provided for automatic over-the-air updating of a preferred roaming list (PRL) in a multi-mode device, based on an account association between the device and a wireless local area network (WLAN) access point. For each of a plurality of subscriber accounts, a set of subscriber account data is maintained in data storage, indicating an association between the subscriber account and one or more telecommunication devices. A determination is made that a given subscriber account is associated with both (i) a multi-mode device and (ii) a WLAN access point. In response to the determination, a PRL for the multi-mode device is automatically updated to include access data for the WLAN access point.

14 Claims, 8 Drawing Sheets

ACQUISITION TABLE 234

| INDEX | FREQUENCY |
|---|---|
| 1 | WWAN_1 |
| 2 | WWAN_2 |
| 3 | WLAN_3 |
| 4 | WLAN_4 |

261, 262, 263, 264

SYSTEM TABLE 236

| SYSTEM | PREF | INDEX |
|---|---|---|
| SID_NID_1 | 1 | 1 |
| SID_NID_2 | 2 | 2 |
| SSID_MAC_3 | 3 | 3 |
| SSID_MAC_4 | 4 | 4 |

271, 272, 273, 274

PREFERRED ROAMING LIST (PRL) 230

DEVICE DATA 214

FIG. 2B

AUTOMATIC OVER-THE-AIR UPDATING OF A PREFERRED ROAMING LIST (PRL) IN A MULTI-MODE DEVICE, BASED ON AN ACCOUNT ASSOCIATION BETWEEN THE DEVICE AND A WIRELESS LOCAL AREA NETWORK (WLAN) ACCESS POINT

CROSS-REFERENCE TO RELATED APPLICATIONS

This application claims priority to U.S. Provisional Patent Application No. 60/662,335, filed Mar. 16, 2005.

BACKGROUND

1. Technical Field

The present invention relates to wireless communications and, more particularly, to detecting and accessing radio networks.

2. Description of Related Art

More people than ever are using mobile stations, such as cell phones and personal digital assistants (PDAs), to connect to wireless wide area networks (WWANs), which are also referred to as cellular wireless communication systems, cellular wireless networks, and by other names. WWANs typically provide both voice and packet-data communication using a wireless communication format such as Code Division Multiple Access (CDMA), or another format.

Mobile stations (such as cell phones) typically store a "preferred roaming list" (PRL), which includes a prioritized listing of communication systems (such as WWANs) that the mobile station may access. In a CDMA system, for instance, a PRL typically includes (i) an acquisition table that instructs the mobile station which radio frequency (RF) channels to search and (ii) a system table that specifies, for each allowed system, a respective system identification code (SID) and network identification code (NID). Each CDMA base station broadcasts its SID and NID in system overhead messages. Thus, when a mobile station detects an allowed SID-and-NID combination, the mobile station may connect to the identified system.

In practice, an initial or default PRL is typically loaded into a mobile station before a wireless carrier distributes the mobile station to a subscriber. The carrier may thereafter load a new PRL into the mobile station at a customer service center or over the air, using over-the-air service provisioning (OTASP), as defined by industry standard EIA/TIA IS-683-C, "Over-the-Air Service Provisioning of Mobile Stations in Spread Spectrum Systems," published Mar. 20, 2003, which is incorporated herein by reference. In operation, then, mobile stations connect with various WWANs listed on their PRLs according to the listed priorities, and perhaps according to other decision logic and arbitration logic stored in the mobile station.

In addition to WWANs, wireless local area networks (WLANs) are becoming increasingly popular. WLANs typically cover an area that is geographically smaller than that covered by a typical WWAN, and often provide a signal in that area that is superior to that provided by the WWAN. For example, a WLAN may cover a single residence (such as an apartment), a single building, or a proximally-located group of buildings, perhaps on a corporate or academic campus. WLANs typically provide one or more "access points," which provide a wireless coverage area and access to a packet-data network. A common use of a WLAN is packet-data communication by a wireless-communication-capable laptop computer, or perhaps by another device such as a digital video recorder (DVR) or another appliance or computer. A commonly-used set of protocols for wireless communication between and among these access points and devices are those specified by the Institute of Electrical and Electronics Engineers (IEEE) 802.11 standards, collectively referred to as "IEEE 802.11x."

Recently, the telecommunications industry has witnessed widespread growth in the area of voice-over-IP (VoIP) technology; that growth, combined with the ever-increasing prevalence of mobile stations engaging in packet-data communication generally, has caused the industry to begin to introduce mobile stations ("multi-mode devices") that are equipped to engage in both (i) voice and packet communications via WWANs (using, e.g., CDMA) and (ii) packet-data communications (including VoIP communications) via WLANs (using, e.g., IEEE 802.11x).

In one arrangement, for instance, a cellular wireless carrier may operate a gateway that provides connectivity between a packet-switched network and the wireless carrier's transport and signaling networks. The carrier may then distribute to its subscribers multi-mode devices, which may be capable of communicating in a WWAN mode with one or more types of WWANs and of communicating in a WLAN mode with one or more types of WLANs.

When a multi-mode device is within the coverage area of the carrier's WWAN infrastructure, the device may operate conventionally as a standard cellular telephone, with signaling passing through the carrier's signaling network and bearer data passing through the carrier's transport network. When the multi-mode device moves into the coverage area of a WLAN access point, on the other hand, the device may engage in IP-based signaling and IP-based bearer communication with the carrier's gateway, which may then interface the signaling and bearer communications with the carrier's signaling and transport networks.

PRLs can be extended to the context of multi-mode devices. In particular, a PRL stored by a multi-mode device may list (in the acquisition table) one or more WLAN frequencies and (in the system table) one or more WLAN service set identifiers (SSIDs) (each, in effect, an identifier of a WLAN system) that the multi-mode device may access. More particularly, for each WLAN access point that the multi-mode device is allowed to access, the PRL may list an SSID and MAC (Media Access Control) address of the access point. Thus, when the multi-mode device enters the coverage area of such a WLAN, the device may detect an SSID authorized by its PRL, and may responsively work to associate with the access point.

SUMMARY

Methods and systems are provided for automatic over-the-air updating of a preferred roaming list (PRL) in a multi-mode device, based on an account association between the device and a wireless local area network (WLAN) access point. In an exemplary embodiment, a wireless carrier will maintain data reflecting an account association between a given multi-mode device and a given WLAN access point (i.e., indicating that both are registered under the same user's account). Perhaps via over-the-air service provisioning, the carrier will automatically send to the device the SSID (and perhaps the MAC address) of the access point, and the device will automatically add that SSID to the device's PRL, so that the device can then conveniently connect to the access point. This automatic over-the-air provisioning can occur when the device is first provisioned, or it can occur in response to initial configuration and/or registration of the access point, or in response to some other trigger.

Thus, in one respect, an exemplary embodiment of the present invention may take the form of a method. In accordance with the method, for each of a plurality of subscriber accounts, a set of subscriber account data is maintained in data storage, indicating an association between the subscriber account and one or more telecommunication devices. A determination is made that a given subscriber account is associated with both (i) a multi-mode device and (ii) a WLAN access point. In response to the determination, a PRL for the multi-mode device is automatically updated to include access data for the WLAN access point.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 2B is a simplified block diagram of an exemplary set of data that may be stored by a multi-mode device, in accordance with exemplary embodiments;

DETAILED DESCRIPTION OF EXEMPLARY EMBODIMENTS

1. Overview

Figure 1:
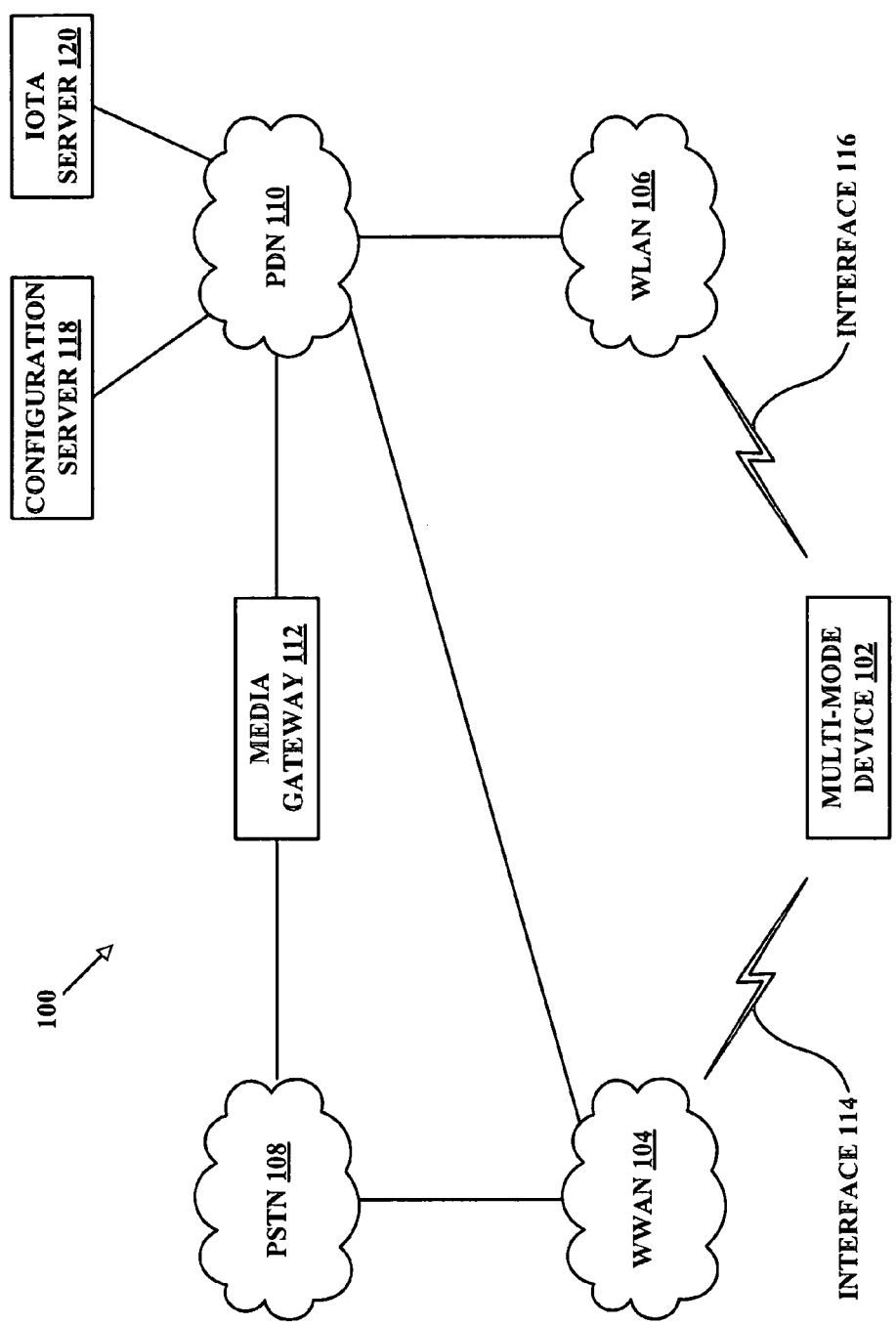
FIG. 1 is a simplified block diagram of an example of a communication system, in accordance with exemplary embodiments.

As presently contemplated, a wireless carrier will maintain data reflecting an account association between a given multi-mode device and a given WLAN access point (i.e., indicating that both are registered under the same user's account), and that association data will be used as a basis to automatically update the device's PRL so as to include the associated access point. Preferably, this updating will be done over the air, using an OTASP-based PRL-update process.

In a preferred arrangement, the wireless carrier will acquire and maintain a record that a given subscriber, having a given subscriber account, has a given WLAN access point with a given SSID and MAC address (or simply an SSID). The carrier may obtain this information by selling or otherwise distributing the access point to the subscriber and, at the time of distribution, recording the access point's SSID and MAC address under the subscriber's account.

The carrier may also obtain this information through automated configuration of the access point. Through a cable-access system, for instance, when the access point is first powered on, the access point may automatically signal to a predefined IP address of a configuration server (preprogrammed into the access point), providing the configuration server with its SSID and MAC address, in addition to user account information (username, password, cell phone number, etc.), which the user may provide during a configuration sequence for the access point. The configuration server may then send that access information to a Home Location Register (HLR) maintaining an account for the subscriber, signal to the HLR that the configuration server has the information, and/or otherwise store that access information in the subscriber's account.

Further, the carrier will acquire and maintain a record that the given subscriber has a given multi-mode device. In a typical arrangement, the carrier can obtain this information at the time the device is provisioned, whether at a service center or over the air. In an OTASP process, the device would signal to an IP Over the Air (IOTA) server, reporting device-identification data and receiving various provisioning objects in response. The carrier will then determine that the subscriber's account is associated with both devices, and will responsively update the PRL for the device to include the SSID and MAC address of the access point.

This may occur when the carrier has already learned of the subscriber's access point and thereafter learns that the subscriber has a multi-mode device. For example, the subscriber's access point may be registered with the configuration server, and the subscriber may thereafter buy a multi-mode device. When that device is provisioned, the carrier may detect that the device is a multi-mode device (perhaps by reference to a device profile database), and may query the subscriber's account to determine if any access points are associated with the account. Seeing that an access point is so associated, the carrier may then include access information (SSID, MAC address) of the access point in the PRL that it delivers to the multi-mode device.

Alternatively, this process may occur once the carrier has learned of the subscriber's multi-mode device, and thereafter learns that the subscriber has an access point. By way of example, the subscriber may have a multi-mode device associated with the subscriber's account, and thereafter buy an access point. The access point, when powered on, may register with the configuration server. At that point, an updated PRL, including the access point's SSID and MAC address, may be pushed to the subscriber's multi-mode device. Whatever the sequence, the multi-mode device will have a PRL that contains access information for the access point, and may thereafter conveniently connect to the access point.

2. Exemplary Architecture a. Exemplary Communication System

FIG. 1 is a simplified block diagram of an example of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, the communication system 100 includes a multi-mode device 102, a wireless wide area network (WWAN) 104, a wireless local area network (WLAN) 106, a public switched telephone network (PSTN) 108, a packet-data network (PDN) 110, a media gateway 112, a configuration server 118, and an IP Over-the-Air (IOTA) server 120. It should be understood that the entities depicted in FIG. 1 are illustrative. For example, there could be any number of multi-mode devices and other devices in communication with WWAN 104, WLAN 106, PSTN 108, and PDN 110. As another example, there could be any number of intermediate devices and networks making up all or part of any of the communication links shown in FIG. 1. As an example, there could be one or more routers or other devices on the communication link between WLAN 106 and PDN 110.

Multi-mode device 102 may be any mobile device capable of communicating with one or more WWANs, such as WWAN 104, and with one or more WLANs, such as WLAN 106. Multi-mode device 102 may communicate with WWAN 104 over an air interface 114 using a protocol such as CDMA and with WLAN 106 over an air interface 116 using a protocol such as IEEE 802.11. Multi-mode device 102 is described more fully in connection with FIGS. 2A and 2B, and may, in general, be any device capable of communicating with both WWANs and WLANs, and of carrying out the functions described herein. As examples, multi-mode device 102 may be a multi-mode cellular phone, multi-mode PDA, or multi-mode laptop computer.

Figure 3A:
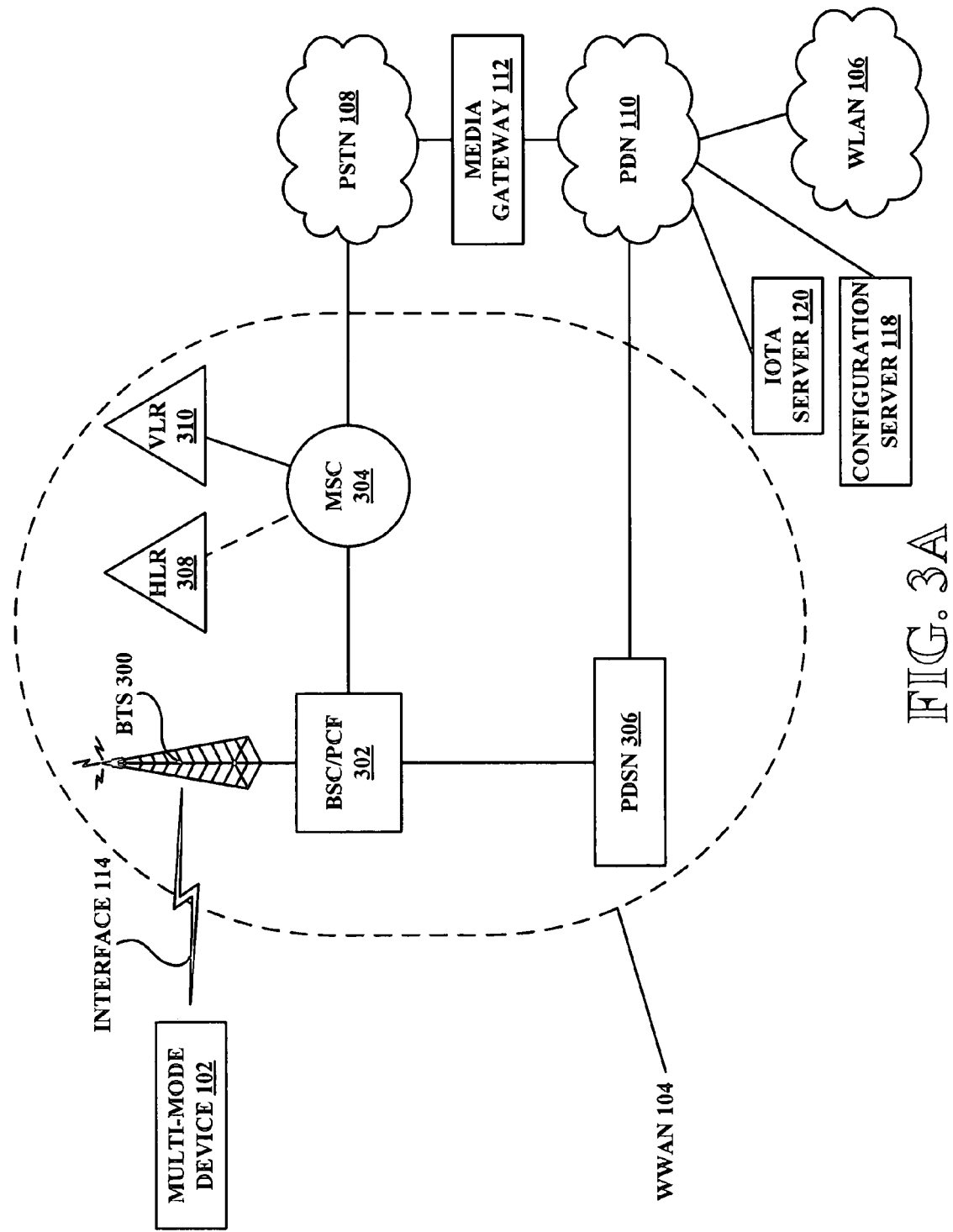
FIG. 3A is a simplified block diagram of an exemplary wireless wide area network (WWAN), in accordance with exemplary embodiments.

WWAN 104 is explained more fully in connection with FIG. 3A, but in general may be any WWAN capable of communicating over air interface 114 with multiple mobile devices, such as device 102, using a wireless communication protocol such as CDMA. One such wireless format is the well-known Cdma$_{2000}$®, as described in "CDMA 2000® Series," TIA/EIA/IS-2000-Series, Rev. A (March 2000), which is incorporated herein by reference. WWAN 104 may be communicatively coupled with at least PSTN 108, PDN 110, and one or more mobile devices.

Figure 4:
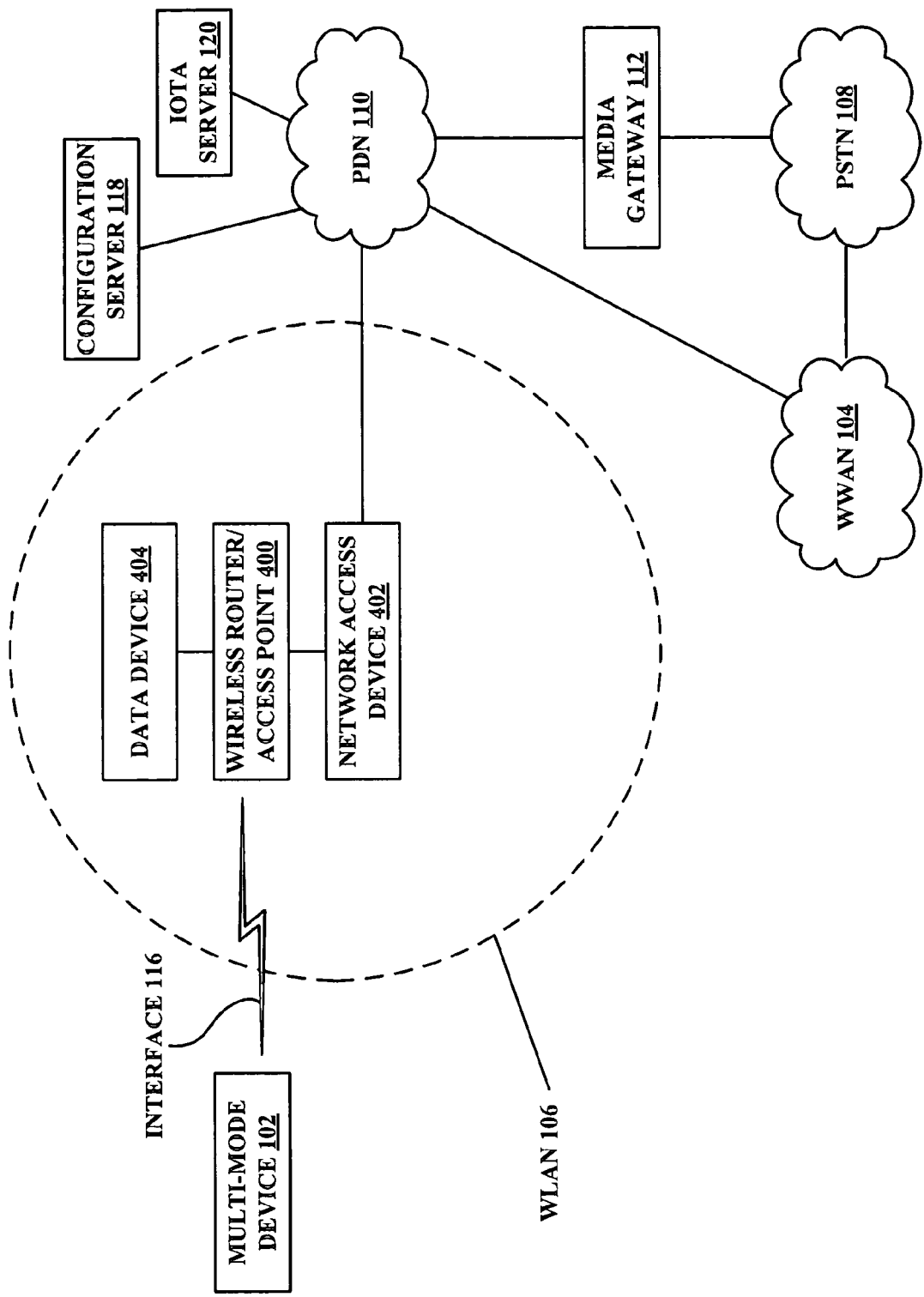
FIG. 4 is a simplified block diagram of an exemplary wireless local area network (WLAN), which may be used in accordance with exemplary embodiments.

WLAN 106 is explained more fully in connection with FIG. 4, but in general may be a WLAN capable of communicating over air interface 116 with multiple mobile devices, such as device 102, using a wireless communication protocol such as IEEE 802.11g™, as described in "IEEE Standard for Information Technology, Telecommunications and Information Exchange Between Systems, Local and Metropolitan Area Networks, Specific Requirements, Part 11: Wireless LAN Medium Access Control (MAC) and Physical Layer (PHY) Specifications, Amendment 4: Further Higher Data Rate Extension in the 2.4 GHz Band," published June 2003, which is incorporated herein by reference. The use of 802.11g™ is exemplary; other 802.11 standards and other wireless protocols could be used. WLAN 106 may be communicatively coupled with at least PDN 110 and one or more mobile devices.

PSTN 108 may be the well-known circuit-switched network known as the Public. Switched Telephone Network, and may be communicatively coupled with at least WWAN 104 and media gateway 112. PDN 110 may be communicatively coupled with at least media gateway 112, WWAN 104, WLAN 106, configuration server 118, and IOTA server 120, and may include one or more wide area networks (WANs), one or more local area networks (LANs), one or more public networks such as the Internet, one or more private networks, one or more wired networks, and/or one or more wireless networks. Devices in communication with PDN 110 may exchange data using a packet-switched protocol such as the Internet Protocol (IP), and may be identified by an address such as an IP address.

Media gateway 112 may be a networking device (such as a server) arranged to pass communications between PSTN 108 and PDN 110. As such, media gateway 112 may have one interface for communicating with PSTN 108 and another interface for communicating with PDN 110. Gateway 112 may thus receive circuit-switched signaling and bearer communications from PSTN 108, convert those communications to a packet-based format, and transmit those communications to PDN 110. Conversely, gateway 112 may receive packet-based signaling and bearer communications from PDN 110, convert those communications to a circuit-switched format, and transmit those communications to PSTN 108.

Configuration server 118 and IOTA server 120 may each be a networking device (such as a server) arranged to carry out the functions described herein. As such, configuration server 118 and IOTA server 120 may each include a processor, data storage, and a communication interface for sending and receiving data over PDN 110. Configuration server 118 and IOTA server 120 may, in fact, be a single server, or may be functional parts of one or more other network entities.

b. Exemplary Multi-Mode Device

Figure 2A:
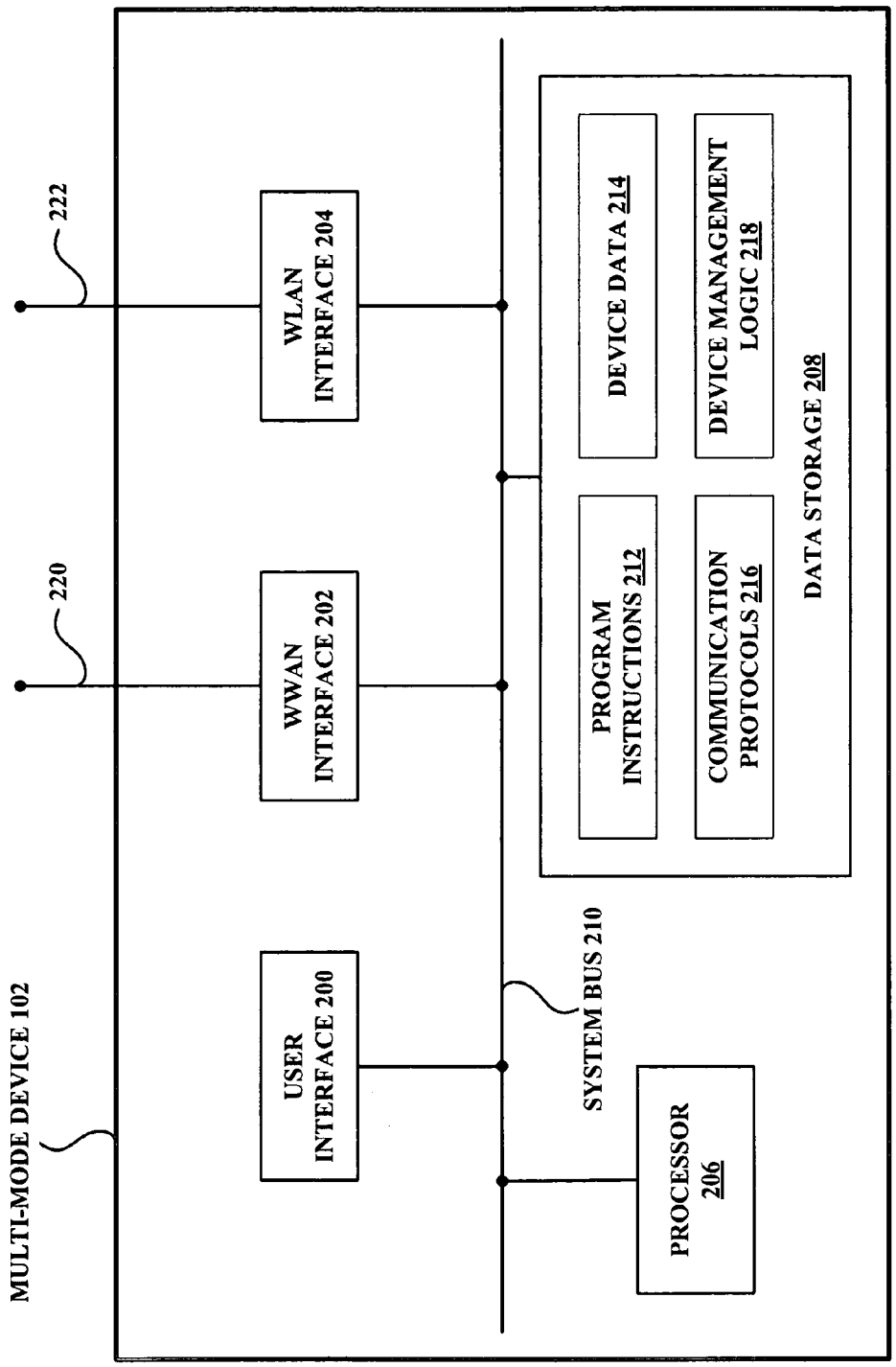
FIG. 2A is a simplified block diagram of an exemplary multi-mode device, which may be used in accordance with exemplary embodiments.

FIG. 2A is a simplified block diagram of an exemplary multi-mode device, which may be used in accordance with exemplary embodiments. In particular, FIG. 2A depicts multi-mode device 102 of FIG. 1. As shown in FIG. 2A, multi-mode device 102 includes a user interface 200, a WWAN interface 202, a WLAN interface 204, a processor 206, and data storage 208, all of which may be communicatively linked by a system bus 210. In general, device 102 may be any device arranged to communicate over air interfaces with WWANs and WLANs, and carry out the functions described herein. In this example, device 102 is a multi-mode cell phone.

User interface 200 includes one or more mechanisms for receiving inputs from users, and one or more mechanisms for communicating outputs to users. Cell phone user interfaces are known in the art, and thus are not described in detail here. Suffice it to say that user interface 200 may include buttons, a touch screen, a microphone, and any other mechanisms now known or later developed for receiving inputs, as well as an LCD or other display, speakers, and any other mechanisms now known or later developed for communicating outputs.

WWAN interface 202 may be a chipset arranged to communicate over air interface 114 with WWAN 104 according to a protocol such as Cdma2000®. This chipset may then interface with an antenna 220 to facilitate communication with WWAN 104. WLAN interface 204 may be a chipset arranged to communicate over air interface 116 with WLAN 106 according to a protocol such as IEEE 802.11x. This chipset may then interface with an antenna 222 to facilitate communication with WLAN 106. It should be understood that WWAN interface 202 and WLAN interface 204 may share a common antenna. Further, the two interfaces may be integrally formed, or may in fact be a single interface, such as a single chipset capable of communication with both WWAN 104 and WLAN 106.

Processor 206 may control many operations of multi-mode device 102 by executing a set of program instructions 212 stored in data storage 208, and may comprise multiple (e.g., parallel) processors, such as a general purpose microprocessor and/or a discrete digital signal processor. Data storage 208 may store program instructions 212, device data 214 (described below in connection with FIG. 2B), communication protocols 216, and device management logic 218. Data storage 208 may take various forms, in one or more parts, such as a non-volatile storage block and/or a removable storage medium. Program instructions 212 may be executable by processor 206 to carry out various functions described herein.

FIG. 2B is a simplified block diagram of an exemplary set of data that may be stored by a multi-mode device, in accordance with exemplary embodiments. In particular, FIG. 2B is a diagram of device data 214 of FIG. 2A. As shown in FIG. 2B, device data 214 comprises a preferred roaming list (PRL) 230. In addition to PRL 230, device data 214 may store one or more other types of data. Furthermore, device data 214 could take other forms and be stored among multiple storage media, as the arrangement depicted by FIG. 2B is exemplary in nature.

PRL 230 comprises an acquisition table 234 and a system table 236. It should be understood, however, that PRL 230 could take other forms, and store other types of data as well; furthermore, the various parts of PRL 230 could be stored in a single storage medium or among separate storage media. In this example, acquisition table 234 has four rows, each containing an index for that particular row and an RF frequency on which multi-mode device 102 may search for a communication system to which to connect. As shown in FIG. 2B, row 261 contains the index "1" and an RF channel represented "WWAN_1," indicating this is an RF frequency on which a WWAN denoted "WWAN 1" operates. "WWAN_1" is a representation; the entries in acquisition table 234 may contain numerical representations of RF channels to search. Further to this example, "WWAN 1" represents WWAN 104 of FIGS. 1 and 3A.

Row 262 of acquisition table 234 contains index "2" and an RF frequency "WWAN_2," on which a second WWAN, separate and distinct from WWAN 1, operates. In the example arrangement illustrated by FIG. 2B, WWAN 1 and WWAN 2 are CDMA networks, each operating on a particular frequency or CDMA channel. As such, the frequencies listed in acquisition table 234 for those respective CDMA networks would aid multi-mode device 102 in detecting and connecting to those particular networks.

Rows 263 and 264 of acquisition table 234 list index "3" paired with a frequency for a WLAN designated "WLAN 3" and index "4" paired with a frequency for a WLAN designated "WLAN 4," respectively. The reader should bear in mind that an actual acquisition table in an actual multi-mode device could very well have many more entries than are illustrated in acquisition table 234 of FIG. 2B, as FIG. 2B is exemplary in nature.

Depicted below acquisition table 234 in FIG. 2B is system table 236. Note that the indexes listed in rows 261-264 of acquisition table 234 match the indexes listed in rows 271-274 of system table 236, and that each row 271-274 of system table 236 contains system-identifying data (under "SYSTEM"), a preference indicator (under "PREF"), and the aforementioned indexes (in the "INDEX" column). Other data may be included in a system table as well.

With respect to rows 271 and 272, system-access data is given for WWAN 1 and WWAN 2, respectively. Again, the matching index "1" in rows 261 and 271 indicate that those rows pertain to WWAN 1 and the matching index "2" in rows 262 and 272 indicate that those rows pertain to WWAN 2. As stated, WWAN 1 is, in this example, WWAN 104 of FIGS. 1 and 3A. As such, WWAN 104 is listed on multi-mode device 102's PRL 230, indicating that, as a general matter, multi-mode device 102 is permitted to connect to WWAN 104. Not only that, but WWAN 104 is listed as the most preferred communication system on PRL 230 of multi-mode device 102, which is indicated by the "1" preference value in row 271.

The "SYSTEM" columns of rows 271 and 272 list "SID_NID_1" and "SID_NID_2," respectively, indicating that the "SYSTEM" entry in row 271 contains a System Identification Code (SID) and Network Identification Code (NID) for WWAN 1, and that the "SYSTEM" entry in row 272 contains a SID and NID for WWAN 2. Every CDMA system is uniquely identified by the combination of SID, NID, and Radio Frequency. It can be appreciated from FIG. 2B that, taken together, acquisition table 234 and system table 236 provide this combination for WWAN 1 and WWAN 2. And, CDMA base stations typically broadcast their respective SID and NID in system overhead messages. Thus, once device 102 detects a WWAN listed on its PRL by searching the frequency listed in acquisition table 234, the device 102 can verify the identity of the network by matching the SID and NID broadcast on that frequency to the SID and NID stored in its system table 236.

With respect to rows 273 and 274 of system table 236, system access data is given for WLAN 3 and WLAN 4, respectively. The matching index "3" in rows 263 and 273 indicate that those rows pertain to WLAN 3, while the matching index "4" in rows 264 and 274 indicate that those rows pertain to WLAN 4. In the example arrangement described herein, WLAN 106 of FIGS. 1 and 4 is neither WLAN 3 nor WLAN 4. More explicitly, FIG. 2B depicts PRL 230 at a time when PRL 230 does not include access information for WLAN 106.

Unlike the "SYSTEM" values listed in rows 271 and 272, the "SYSTEM" values listed in rows 273 and 274 of system table 236 do not list a SID or NID, as these values are inapplicable to the WLAN context; since rows 273 and 274 pertain to WLAN 3 and WLAN 4, respectively, these rows each contain access information (SSID and MAC address) for a particular WLAN access point. Specifically, row 273 contains an SSID and MAC address for an access point in WLAN 3 while row 274 contains an SSID and MAC address for an access point in WLAN 4.

Thus, in this example, PRL 230 of multi-mode device 102 contains entries for four communication systems that multi-mode device 102 is permitted to access. Namely, multi-mode device 102 is permitted to access WWAN 1 (also known as WWAN 104), WWAN 2, WLAN 3, and WLAN 4. Note that, while not shown, PRL 230 may also contain information relevant to whether a roaming indication should be displayed on the user interface 200 of multi-mode device 102 while the device is connected to each respective communication system. PRL 230 may also contain a list of systems that multi-mode device 102 is specifically prohibited from accessing, as well as other types of data, such as geographical data regarding the communication systems.

Turning again to FIG. 2A, communication protocols 216 may be useful to receive data from and send data to WWAN 104, WLAN 106, and beyond, and may include one or more Code Division Multiple Access (CDMA) protocols such as Cdma2000®, one or more Time Division Multiple Access (TDMA) protocols, Advanced Mobile Phone Service (AMPS), Global System for Mobile Communications (GSM), HyperText Transfer Protocol (HTTP), Session Initiation Protocol (SIP), Real-Time Transport Protocol (RTP), Transmission Control Protocol (TCP), User Datagram Protocol (UDP), Internet Protocol (IP), Simple Mail Transfer Protocol (SMTP), Dynamic Host Configuration Protocol (DHCP), Domain Name Service (DNS), Internet Control Message Protocol (IMCP), Point-to-Point Protocol (PPP), IEEE (Institute of Electrical and Electronics Engineers) 802.11x, Bluetooth®, HiperLAN, Multichannel Multipoint Distribution Service (MMDS), HomeRF, one or more proprietary protocols, and/or one or more other protocols. Compatible protocols may be stored in other entities in communication with multi-mode device 102. Device management logic 218 may be used to manage aspects of multi-mode device 102 such as memory and file management.

c. Exemplary Wireless Wide Area Network (WWAN)

FIG. 3A is a simplified block diagram of an exemplary wireless wide area network (WWAN), in accordance with exemplary embodiments. In particular, FIG. 3A is a diagram of WWAN 104 of FIG. 1. It should be understood that a WWAN could take many other forms as well, and that the arrangement shown in FIG. 3 is provided by way of example. As shown in FIG. 3A, WWAN 104 includes a base transceiver station (BTS) 300, a base station controller/packet control function (BSC/PCF) 302, and a mobile switching center (MSC) 304, which are arranged and coupled with each other in a manner well known in the cellular telephony field. WWAN 104 could also be referred to as a "wireless access network" or "radio access network," as devices communicate with WWAN 104 via an RF air interface.

BTS 300 comprises a tower with antennas that radiate to define air interface 114. And BSC/PCF 302 communicates with wireless devices over that air interface according to an agreed protocol. Example air interface protocols include Advanced Mobile Phone Service (AMPS), Code Division Multiple Access (CDMA), Time Division Multiple Access (TDMA), and Global System for Mobile communication (GSM). As an example, the air interface protocol could comply with the standards IS-95 and Cdma2000®, which are incorporated by reference.

MSC 304 then functions as a switch to provide connectivity with other switches in PSTN 108. Further, MSC 304 may be coupled via a signaling link with a home location register (HLR) 308 that stores service profiles (subscriber accounts) for various wireless devices such as device 102. And MSC 304 may include or be interconnected with a visitor location register (VLR) 310 that stores local copies of those profiles for wireless devices that are currently operating within the wireless coverage area of MSC 304. And although FIG. 3A shows BSC/PCF 302 and MSC 304 as separate entities, the two could instead be co-located and integrated together.

WWAN 104 enables suitably-equipped wireless devices, such as multi-mode device 102, to place and receive calls over PSTN 108 and/or over one or more other circuit-switched or packet-switched transport networks. Conventionally, multi-mode device 102 will subscribe to service with a wireless carrier that operates WWAN 104. Therefore, the carrier would have set up multi-mode device 102 to operate under a particular directory number, often known as a "mobile identification number" or "mobile directory number." In particular, the carrier would have programmed the assigned directory number into a Number Assignment Module (NAM) of multi-mode device 102, and the carrier would have established a subscriber account in HLR 308 for that directory number/device. Further, device 102 would have a unique electronic serial number (ESN), which may be hard coded or programmed into it.

When device 102 powers on or otherwise enters into the coverage of air interface 114, device 102 registers with MSC 304, such as by sending a registration message over an access channel and via BSC/PCF 302 to MSC 304. MSC 304, in cooperation with other network entities, would then authenticate the device, and HLR 308 would provide MSC 304 with a copy of device 102's service profile for storage in VLR 310, and for later reference by MSC 304. Thereafter, device 102 may conduct calls on PSTN 108 via WWAN 104, as is known in the art.

For providing packet-data connectivity to device 102, WWAN 104 includes a PDSN 306, and BSC/PCF 302 includes a packet control function for facilitating communication between device 102 and PDSN 306. In operation, device 102 may request packet-data connectivity by sending a packet-data origination request over an access channel to BSC/PCF 302. BSC/PCF 302 may then engage in signaling with MSC 304 and with PDSN 306, and PDSN 306 and device 102 may negotiate over a traffic channel to establish a data link, such as a point-to-point protocol connection, between device 102 and PDSN 306. After that process is successful, PDSN 306 acts as a network access server, providing device 102 with access to PDN 110.

Figure 3B:
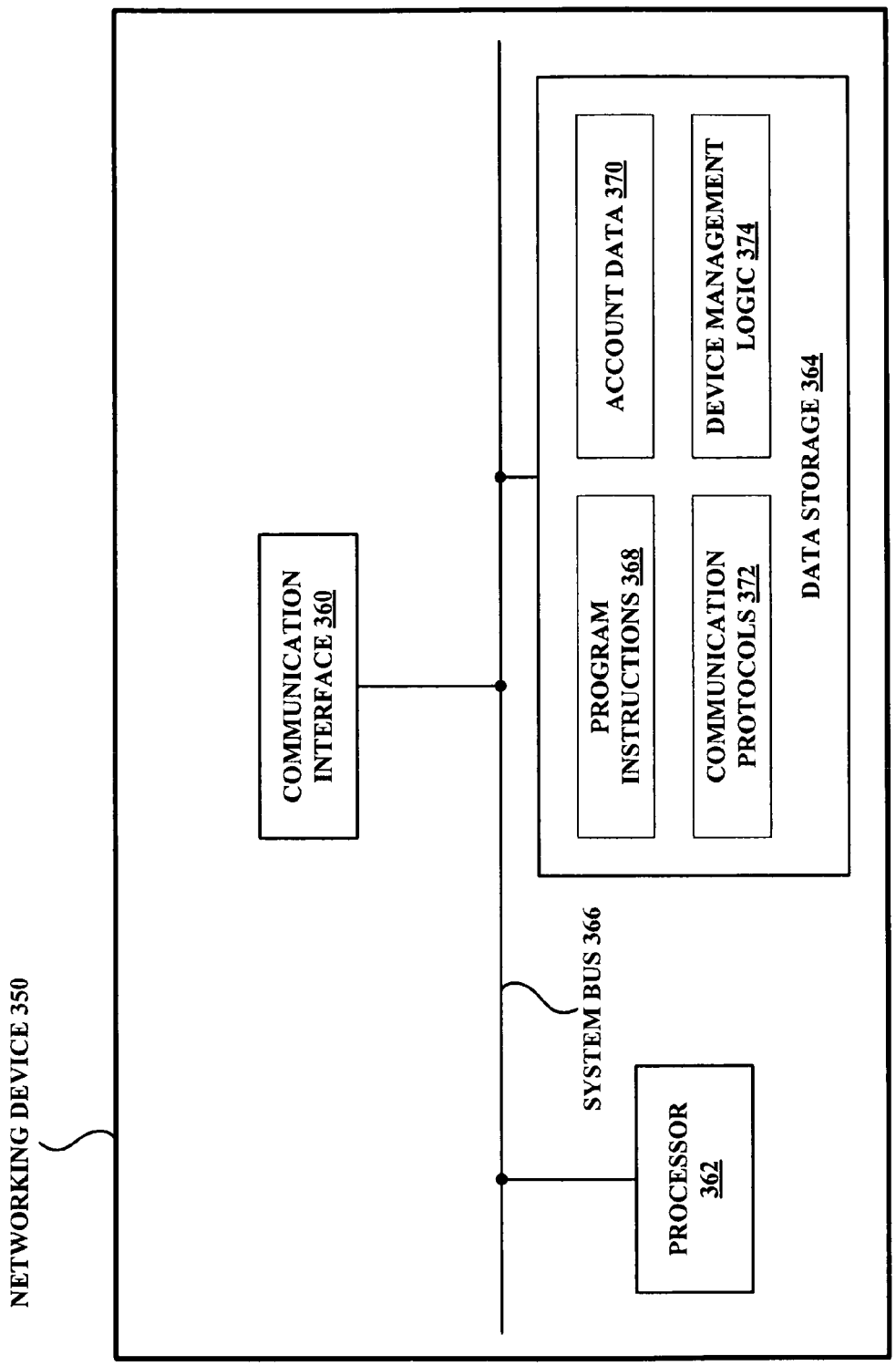
FIG. 3B is a simplified block diagram of an exemplary networking device, which may be used in accordance with exemplary embodiments.

FIG. 3B is a simplified block diagram of an exemplary networking device, which may be used in accordance with exemplary embodiments. In particular, networking device 350 of FIG. 3B may represent the inner structure of MSC 304, HLR 308, VLR 310, configuration server 118, IOTA server 120, and/or any other networking device in communication with the communication system 100 of FIG. 1, any combination of which may be arranged and programmed to carry out the functions described herein. As shown in FIG. 3B, networking device 350 includes a communication interface 360, a processor 362, and data storage 364, all of which may be communicatively linked by a system bus 366. In general, networking device 350 may be any device arranged to carry out some or all of the functions described herein.

For example, networking device 350 may be arranged and programmed to maintain a set of subscriber accounts in data storage 364 (specifically in account data 370), each account containing an association between the subscriber account and one or more telecommunication devices. Data storage 364 may further store program instructions 368 to cause networking device 350 to (i) store a first indication in a given subscriber account that the account is associated with multi-mode device 102; (ii) store a second indication in the account that the account is also associated with a WLAN access point; (iii) make a determination that the account is associated with both multi-mode device 102 and the access point; and (iv) in response to the determination, automatically update PRL 230 (such as by using an over-the-air updating process) to include access data for the WLAN access point.

Data storage 364 may also include a set of communication protocols 372 for use in communicating with one or more other devices over any of the networks of FIG. 1, or any other communication networks. Communication protocols 372 may include any of the protocols listed above with respect to FIG. 2A, or any other communication protocols. Device management logic 374 may be used to manage aspects of networking device 350 such as memory and file management.

d. Exemplary Wireless Local Area Network (WLAN)

FIG. 4 is a simplified block diagram of an exemplary wireless local area network (WLAN), which may be used in accordance with exemplary embodiments. In particular, FIG. 4 is a diagram of WLAN 106 of FIG. 1. As shown in FIG. 4, WLAN 106 includes a wireless router/access point 400, a network access device 402, and a data device 404. It should be understood that a WLAN could take many other forms as well, and that FIG. 4 is exemplary.

Wireless router/access point 400 may be any device that provides (i) a packet-data connection—such as an Ethernet connection—to network access device 402 and (ii) wired and wireless packet-data connections—such as Ethernet and IEEE 802.11x connections—to one or more devices such as device 404 and device 102. As such, wireless router/access point 400 may have an Ethernet interface for connecting to network access device 402, one or more Ethernet interfaces for connecting to other devices, and a wireless-communication interface for wirelessly connecting to devices such as device 102 over air interface 116. Wireless router/access point 400 may also have a processor and data storage for carrying out the functions described herein. As an example, wireless router/access point 400 could be the Linksys WRT54GS.

Furthermore, wireless router/access point 400 could use a protocol other than IEEE 802.11, such as any of the wireless protocols mentioned herein, or any other wireless protocol. And instead of a router/access point, just an access point could be used, in which case device 404 would connect wirelessly with that access point.

Network access device 402 may be any device that provides (i) a packet-data connection—such as an Ethernet connection—to wireless router/access point 400 and (ii) a packet-data connection to PDN 110. Network access device 402 thus functions to pass packet-data communications from PDN 110 to wireless router/access point 400, and to pass packet-data communications from wireless router/access point 400 to PDN 110. As such, network access device 402 may have interfaces for connecting with wireless router/access point 400 and with PDN 110, as well as a processor and data storage to aid in carrying out the functions described herein. Network access device 402 could, as examples, be a cable modem or a DSL modem.

In the case of network access device 402 being a cable modem, the communications passing between it and PDN 110 may comply with DOCSIS packet-cable standards, or with some other standards. In that case, the link between network access device 402 and PDN 110 may include coaxial cable, fiber optic cable, one or more fiber nodes for translating between communications carried on coaxial and fiber optic cable, a cable headend, and any number of other devices. As an example, network access device 402 may be the Linksys BEFCMU10. As an alternative, wireless router/access point 400 and network access device 402 could be replaced by a single device that could carry out the functions described with respect to both.

Data device 404 may be any computing device physically or wirelessly connected to wireless router/access point 400. As examples, device 404 could be a desktop or laptop computer, another multi-mode device, a DVR, an appliance, or any other digital device capable of communicating with wireless router/access point 400. As another possibility, device 404 may not be present at all, and is included largely to show that wireless router/access point 400 can handle interfacing between network access device 402 and one or more other devices.

3. Exemplary Operation a. A First Exemplary Method

Figure 5:
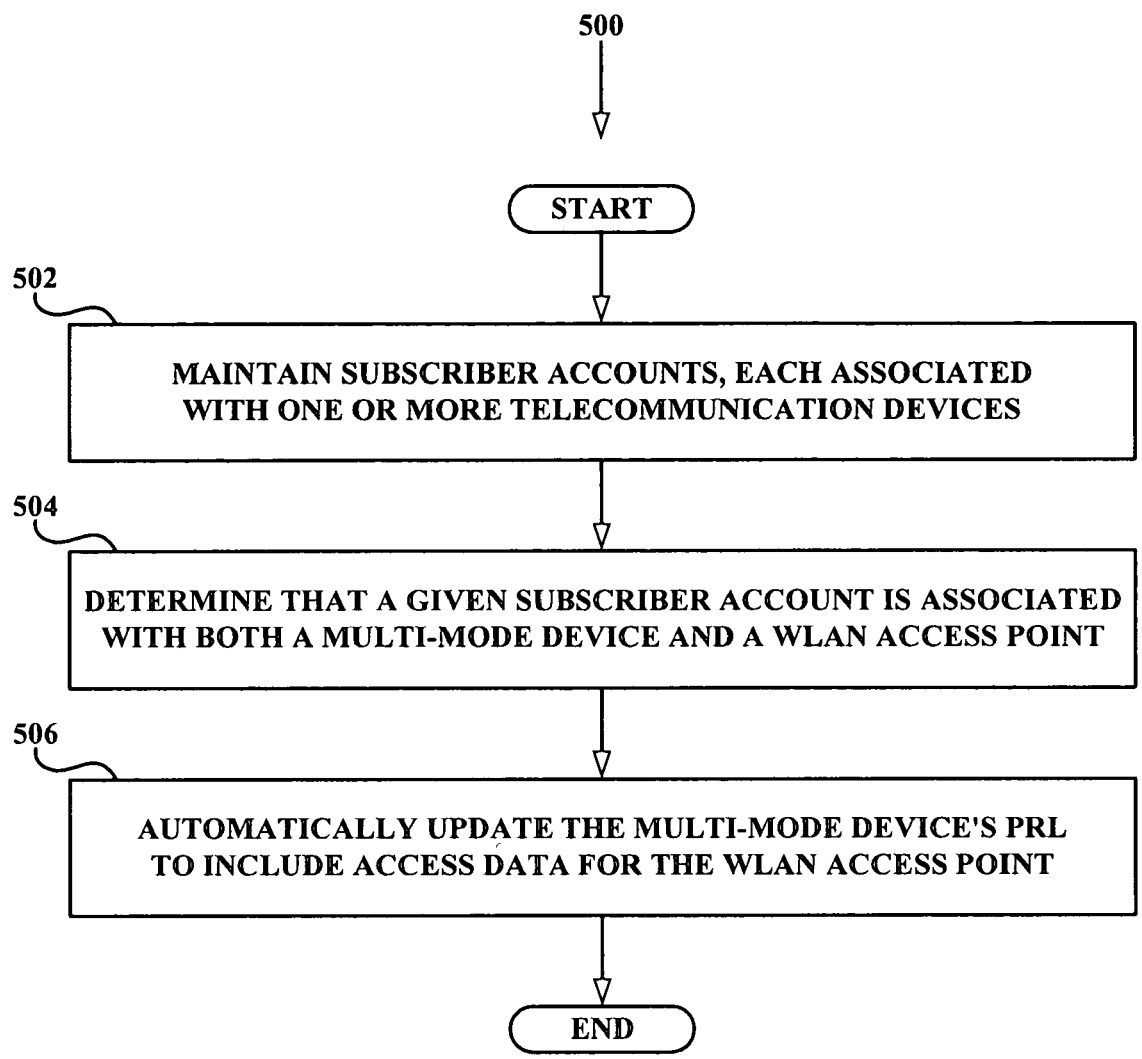
FIG. 5 is a flowchart of an exemplary embodiment, in the form of a method carried out along the communication system of FIG. 1.

FIG. 5 is a flowchart of an exemplary embodiment, in the form of a method carried out along the communication system of FIG. 1. As shown in FIG. 5, the method 500 begins at step 502, when a wireless carrier maintains a plurality of subscriber accounts for a plurality of wireless subscribers, each account associated with one or more telecommunication devices, such as cellular telephones, multi-mode devices, WLAN access points, and any other types of telecommunication devices. As an example, the carrier may maintain these subscriber accounts in the data storage of HLR 308 of FIG. 3A. As a general matter, it should be understood that the method 500 of FIG. 5 could be carried out by any one or any combination of MSC 304, HLR 308, VLR 310, configuration server 118, IOTA server 120, and any other network devices.

Each subscriber account may include a set of subscriber account data that indicates the association between the subscriber account and one or more telecommunication devices. Each account may also include personal-identification information for the associated subscriber, payment information (such as credit card information), and any other type of information.

At step 504, an entity operated by or for the wireless carrier, such as HLR 308, makes a determination that a given subscriber account is associated with both (i) a multi-mode device such as multi-mode device 102 and (ii) a WLAN access point such as wireless router/access point 400 ("access point 400"). Prior to step 504, the carrier may have stored indications in the given account that the account is associated with these two telecommunication devices.

For example, upon provisioning multi-mode device 102 for the subscriber associated with the given account, the carrier may have stored a first indication in the given subscriber account, the first indication indicating that the account was associated with device 102. This indication may include data specifically identifying multi-mode device 102, such as device 102's Electronic Serial Number (ESN), and/or data that lists the type of device, such as data that reflects device 102's multi-mode capability. The provisioning of device 102 could occur at a customer service center, or via an OTASP process. Either way, the carrier's network may automatically detect that the provisioning process is occurring or has occurred, and may responsively store the first indication in the account, associating the account with device 102.

Furthermore, also prior to step 504, the carrier may store a second indication in the particular account, the second indication indicating an association between the account and access point 400, reflecting, in this example, that the same wireless subscriber owns and operates both device 102 and access point 400. The storing of this second indication may occur in a variety of ways. For example, the carrier may sell or otherwise distribute access point 400 to the subscriber associated with the given account. Either automatically in response to such sale or distribution, or via manual entry by a sales clerk for example, an SSID and/or MAC address for access point 400 may be stored in the subscriber's account. The account may also store only an indication that the account is associated with a WLAN access point, as well as an IP address of a server which may store the actual SSID and MAC address for access point 400.

As another example, the second indication, associating the given subscriber account with access point 400, may be stored in the account as a result of an automatic configuration sequence for the access point. For example, the subscriber may purchase access point 400 at a retail outlet, and thereafter take access point 400 home, connect access point 400 to network access device 402 (a cable modem in this example), and power on access point 400. Access point 400 may then prompt the subscriber to step through a configuration sequence, perhaps presented in an HTML user interface on a personal computer connected by Ethernet cable or wirelessly to access point 400. As part of the configuration sequence, the subscriber may provide information that identifies the account to the carrier, such as a username, password, the subscriber's cellular telephone number, an account number, and/or any other piece or combination of data.

Access point 400 may then, via network access device 402 and PDN 110, transmit both this account-identification information and access data for access point 400 to configuration server 118. The access data may be an SSID, an SSID and MAC address, or some other identifier or combination of data usable by a wireless communication device to detect and connect to access point 400. The SSID may have been chosen by the subscriber during the configuration process, or may be hard-wired or otherwise preprogrammed into access point 400.

Upon receipt of the account-identification data and the access data for access point 400, configuration server 118 may, by reference to a local or remote database, determine that HLR 308 is the HLR that maintains the subscriber account for this particular wireless subscriber. Upon making this determination, configuration server 118 may send a notification message to HLR 308. This notification message may include the account-identification data and the access data. In that case, HLR 308, upon receipt of the notification message, may use the account-identification data to access the subscriber's account, and store the access data for access point 400 in the account as the indication that the account is associated with access point 400.

As another possibility, the notification message sent from configuration server 118 to HLR 308 may contain the account-identification data and an indication that the subscriber account is associated with a WLAN access point. This notification message may also include an IP address of configuration server 118, perhaps as a source address in the message. In response to receiving this notification, HLR 308 may access the subscriber account using the account-identification data, and store a general indication in that account that the account is associated with a WLAN access point, along with the IP address of configuration server 118. As another possibility, HLR 308 may not store the IP address of configuration server 118 in the particular account; rather, HLR 308 may be programmed to know that configuration server 118 maintains records of which subscriber accounts are associated with which WLAN access points.

At step 506, in response to the determination made at step 504, the carrier automatically updates PRL 230 for multi-mode device 102 to include access data for access point 400. Step 506 may be carried out in a number of ways. Preferably, PRL 230 is updated using an over-the-air service provisioning (OTASP) process. The access data included in the updated PRL may include an SSID, a MAC address, and/or another form of access data for access point 400.

To carry out step 506, HLR 308 may send a PRL-update message to IOTA server 120 via MSC 304, PSTN 108, media gateway 112, and PDN 110. This PRL-update message may include data sufficient to identify device 102 (such as a Mobile Identification Number (MIN), ESN, or some other identifier(s)), as well as a complete replacement for device 102's PRL, or a set of data to be added to device 102's existing PRL 230.

Upon receipt of this message, IOTA server 120 may transmit to device 102 a complete or partial PRL as an update to device 102's existing PRL via, for example, PDN 110, media gateway 112, PSTN 108, MSC 304, BSC/PCF 302, and BTS 300, assuming that, at the time, device 102 is connected to WWAN 104. Upon receipt of this update, device 102 may store the PRL in data storage 208, for use in connecting to various systems. At that point, device 102's PRL would include access data for access point 400, among other communication systems.

The relative order of associating the subscriber account with device 102 and access point 400 can vary. For example, the second indication, which associates the account with access point 400, can be stored in the account after the first indication, which associates the account with multi-mode device 102, has already been stored in the account. That is, the subscriber may acquire device 102 and then later acquire access point 400. In that case, upon storing the second indication in the account, HLR 308 may determine that the account is associated with both device 102 and access point 400, and responsively push the earlier-described update message (containing access data for access point 400) to IOTA server 120, such that receipt of the update message by IOTA server 120 will invoke an IOTA session between IOTA server 120 and device 102, resulting in an update to PRL 230 to include access data for access point 400.

Alternatively, the first indication, which associates the account with multi-mode device 102, can be stored in the account after the second indication, which associates the account with access point 400, has already been stored in the account. That is, the subscriber may acquire access point 400 and then later acquire multi-mode device 102. In that case, HLR 308 would likely store the first indication in the account upon device 102 being provisioned for service. Since transmitting a PRL to device 102 would typically be a part of the provisioning process whether access point 400 was in the picture or not, HLR 308 would, in this case, just add the access data for access point 400 to that initial PRL before it was sent to device 102. In this case, a similar process of invoking an IOTA session between IOTA server 120 and device 102 may be employed. Device 102 would thus have a PRL that includes access data for access point 400.

b. A Second Exemplary Method

Figure 6:
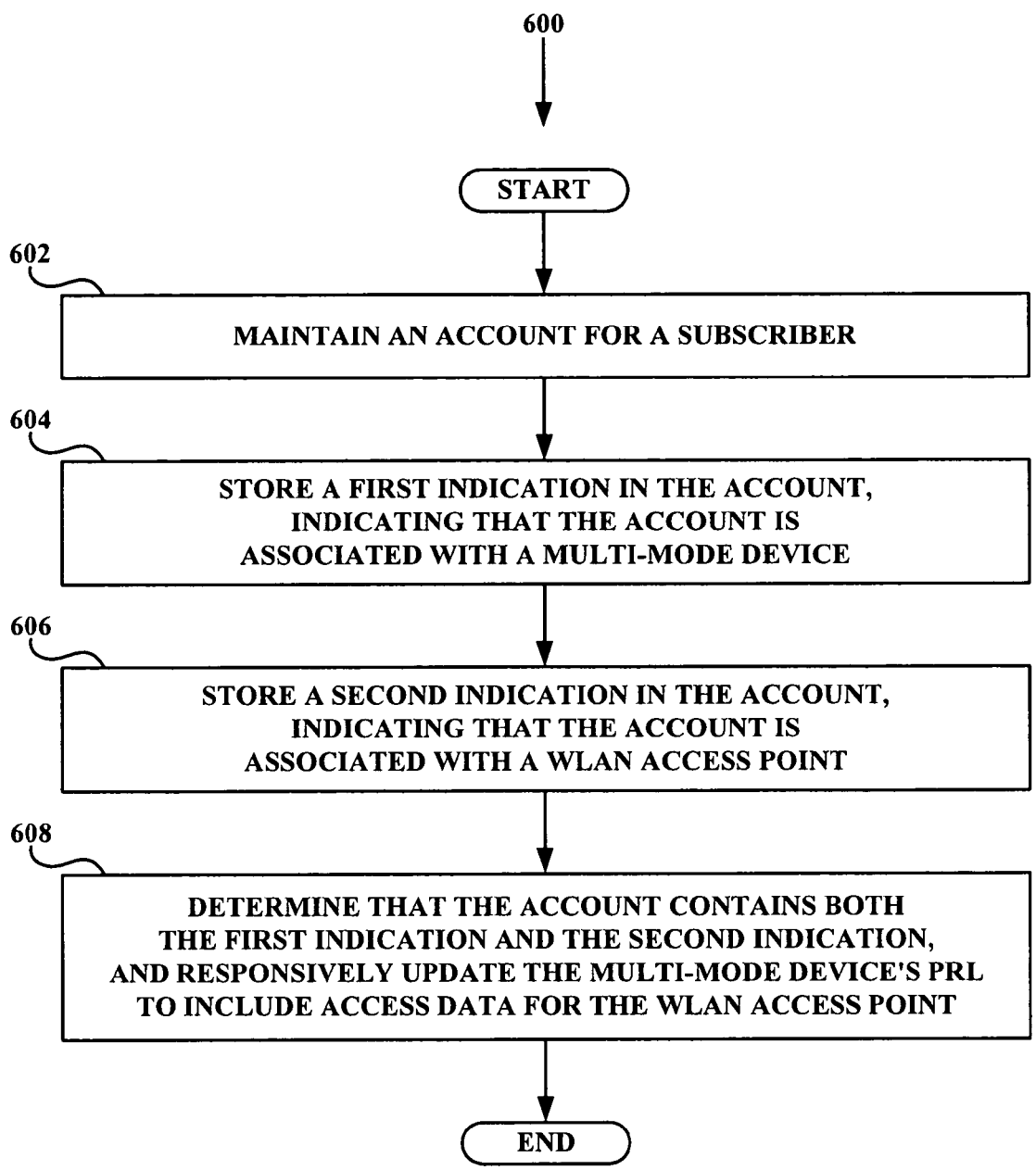
FIG. 6 is a flowchart of an exemplary embodiment, in the form of a method carried out along the communication system of FIG. 1.

FIG. 6 is a flowchart of an exemplary embodiment, in the form of a method carried out along the communication system of FIG. 1. As shown in FIG. 6, the method 600 begins at step 602, when a wireless carrier maintains an account in data storage for a particular subscriber. As with method 500, method 600 could be carried out by any one or any combination of MSC 304, HLR 308, VLR 310, configuration server 118, IOTA server 120, and any other devices.

At step 604, in the manner described above with respect to method 500, the carrier stores a first indication in the account, the first indication indicating that the account is associated with device 102. At step 606, also in the manner described above with respect to method 500, the carrier stores a second indication in the account, the second indication indicating that the account is associated with WLAN access point 400. Steps 604 and 606 can be carried out in any order.

At step 608, the carrier determines that the account contains both the first indication and the second indication, and in response to the determination, automatically updates PRL 230 for device 102 to include access data for access point 400 of WLAN 106. This access data may include an SSID, a MAC address, and/or any other identifier or combination of access data for access point 400. The carrier may make the determination of step 608 by executing an algorithm that involves (i) responsive to storing the first indication in the account, checking whether the account contains the second indication, and (ii) responsive to storing the second indication in the account, checking whether the account contains the first indication.

Note that the carrier may contemporaneously invoke a process to update PRL 230 and store the latter of the two indications in the account. In other words, the determination of step 608 that the account contains both the first and second indications may be a determination that the account contains one of the two, coupled with a determination that the carrier is preparing to store the other. The carrier may store the latter indication and invoke the PRL-updating process at approximately the same time. As above, updating PRL 230 may involve invoking an IOTA session between IOTA server 120 and multi-mode device 102.

4. Conclusion

Various exemplary embodiments have been described above. Those skilled in the art will understand, however, that changes and modifications may be made to those examples without departing from the scope of the claims.

What is claimed is:

1. A method comprising:
    for each of a plurality of subscriber accounts, maintaining in data storage a set of subscriber account data that indicates an association between the subscriber account and one or more telecommunication devices;
    making a determination that a given subscriber account is associated with both (i) a multi-mode device and (ii) a wireless local area network (WLAN) access point; and
    in response to the determination, automatically updating a preferred roaming list (PRL) for the multi-mode device to include access data for the WLAN access point, wherein the method further comprises:
    storing a first indication in the given subscriber account, the first indication indicating an association between the given subscriber account and the multi-mode device;
    storing a second indication in the given subscriber account, the second indication indicating an association between the given subscriber account and the WLAN access point, wherein storing the second indication in the given subscriber account occurs as a result of an automatic configuration sequence for the access point;
    receiving account-identification data and the access data from a configuration server, the configuration server having received at least the access data from the WLAN access point; and
    using the account-identification data to access the given subscriber account,
    wherein storing the second indication in the given subscriber account comprises storing the access data in the given subscriber account.

2. The method of claim 1, wherein automatically updating the PRL for the multi-mode device comprises over-the-air service provisioning (OTASP).

3. The method of claim 1, wherein the access data comprises at least one identifier selected from the group of identifiers consisting of a service set identifier (SSID) and a Media Access Control (MAC) address.

4. The method of claim 1, further comprising:
    detecting when the multi-mode device is provisioned,
    wherein the first indication is stored in the given subscriber account in response to detecting when the multi-mode device is provisioned.

5. The method of claim 1, further comprising:
    distributing the WLAN access point to a subscriber associated with the given subscriber account,
    wherein the second indication is stored in the given subscriber account in response to the WLAN access point being distributed to the subscriber.

6. The method of claim 1, wherein storing the second indication in the given subscriber account occurs after storing the first indication in the given subscriber account.

7. The method of claim 6, further comprising:
    pushing the access data to an Internet Protocol (IP) Over the Air (IOTA) server,
    wherein automatically updating the PRL for the multi-mode device comprises invoking an IOTA session between the IOTA server and the multi-mode device.

8. The method of claim 1, wherein storing the first indication in the given subscriber account occurs after storing the second indication in the given subscriber account.

9. The method of claim 8, wherein automatically updating the PRL for the multi-mode device comprises invoking an Internet Protocol (IP) Over the Air (IOTA) session between the IOTA server and the multi-mode device.

10. A method of automatic over-the-air updating of a preferred roaming list (PRL) for a multi-mode device, based on an account association between the multi-mode device and a wireless local area network (WLAN) access point, the method comprising:
    maintaining in data storage an account for a particular subscriber;
    storing a first indication in the account, the first indication indicating that the account is associated with the multi-mode device;
    storing a second indication in the account, the second indication indicating that the account is associated with the WLAN access point; and
    making a determination that the account contains both the first indication and the second indication, and in response to the determination, automatically updating the PRL for the multi-mode device to include access data for the WLAN access point, the method further comprising:
    receiving account-identification data and the access data from a configuration server, the configuration server having received at least the access data from the WLAN access point; and
    using the account-identification data to access the account, wherein storing the second indication in the account comprises storing the access data in the account.

11. The method of claim 10, wherein making the determination that the account contains both the first indication and the second indication comprises:
    responsive to storing the first indication in the account, checking whether the account contains the second indication; and
    responsive to storing the second indication in the account, checking whether the account contains the first indication.

12. The method of claim 10, wherein updating the PRL comprises invoking an Internet Protocol (IP) Over the Air (IOTA) session between an IOTA server and the multi-mode device.

13. The method of claim 10, wherein the access data comprises at least one identifier selected from the group of identifiers consisting of a service set identifier (SSID) and a Media Access Control (MAC) address.

14. A system comprising:
    a communication interface;
    a processor; and
    data storage comprising program instructions executable by the processor to:
    for each of a plurality of subscriber accounts, maintain in the data storage a set of subscriber account data that indicates an association between the subscriber account and one or more telecommunication devices;
    store a first indication in a given subscriber account, the first indication indicating an association between the given subscriber account and a multi-mode device;
    store a second indication in the given subscriber account, the second indication indicating an association between the given subscriber account and a wireless local area network (WLAN) access point;

make a determination that the given subscriber account is associated with both (i) the multi-mode device and (ii) the WLAN access point; and in response to the determination, automatically update a preferred roaming list (PRL) for the multi-mode device to include access data for the WLAN access point, wherein the data storage further comprises program instructions executable by the processor to:

receive account-identification data and the access data from a configuration server, the configuration server having received at least the access data from the WLAN access point; and use the account-identification data to access the given subscriber account, wherein storing the second indication in the given subscriber account comprises storing the access data in the given subscriber account.

* * * * *

UNITED STATES PATENT AND TRADEMARK OFFICE
CERTIFICATE OF CORRECTION

PATENT NO. : 7,603,119 B1
APPLICATION NO. : 11/366795
DATED : October 13, 2009
INVENTOR(S) : Durig et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 630 days.

Signed and Sealed this

Fifth Day of October, 2010

David J. Kappos
*Director of the United States Patent and Trademark Office*